United States Patent [19]

Okuna et al.

[11] Patent Number: 4,777,499

[45] Date of Patent: Oct. 11, 1988

[54] METHOD AND APPARATUS FOR IMAGE RECORDING

[75] Inventors: Kenji Okuna; Hidefumi Ohtsuka; Sayoko Ohba; Takaomi Nishigaito; Katsumi Muroi, all of Ibaraki; Tsutomu Iimura, Tachikawa; Ryoji Kojima, Katsuta, all of Japan

[73] Assignees: Hitachi, Ltd.; Hitachi Metals, Ltd.; Hitachi Koki, all of Tokyo, Japan

[21] Appl. No.: 152,841

[22] Filed: Feb. 5, 1988

[30] Foreign Application Priority Data

Jul. 8, 1987 [JP] Japan .................. 62-168730

[51] Int. Cl.$^4$ .................................... G01D 15/10
[52] U.S. Cl. .................. 346/160.1; 346/155
[58] Field of Search ............ 355/3 DD, 3 R; 346/1.1, 346/160.1, 155, 150, 153.1, 74.2, 74.5; 400/119; 101/DIG. 13, DIG. 5; 358/300, 301

[56] References Cited

U.S. PATENT DOCUMENTS

| | | | |
|---|---|---|---|
| 2,584,695 | 8/1947 | Good et al. | 346/160.1 |
| 2,932,548 | 4/1960 | Nau et al. | 346/160.1 |
| 3,816,840 | 6/1974 | Kotz | 346/160.1 |
| 4,460,907 | 7/1984 | Nelson | 346/153.1 |
| 4,464,672 | 8/1984 | Lindahl | 346/153.1 |

FOREIGN PATENT DOCUMENTS 58-50557  3/1983  Japan .................. 346/160.1

Primary Examiner—Arthur G. Evans
Attorney, Agent, or Firm—Antonelli, Terry & Wands

[57] ABSTRACT

A method and an apparatus for recording an image is disclosed, in which toner is supplied between a conductive recording drum covered with an insulating material and recording electrodes with the forward end thereof with a small gap from the drum and inclined at a great angle upstream of the direction of rotation of the recording drum. A toner carriage force is generated in the toner to flow out downstream by rotation of the recording drum. A permanent magnet is arranged in the recording drum to form a toner chain inclined at a great angle downstream of the recording drum from the forward end of the recording electrodes. The component of the magnetic force of the magnet in the direction of drum movement is balanced with the toner carriage force. Upon application of a recording voltage to the recording electrodes under this condition, the toner of the most downstream toner chain in contact with the drum surface develops a force of adhesion to the recording drum so that the drum rotates downstream with the toner attached thereon, thus forming an image due to the toner on the recording drum.

14 Claims, 7 Drawing Sheets

FIG. 6

| IMAGE QUALITY / ANGLE | IMAGE SHARPNESS | HIGH DENSITY | SMALL BLUR |
|---|---|---|---|
| ELECTRODE ANGLE 90° | | | |
| ELECTRODE ANGLE 30° | | | |
| ELECTRODE ANGLE 15° | | | | ic material. When the first magnetic roll 21 is driven in the
METHOD AND APPARATUS FOR IMAGE RECORDING

BACKGROUND OF THE INVENTION

1. Field of the Invention

The present invention relates to a method and apparatus for recording an image by toner directly on a recording member by an image signal voltage to a recording electrode.

2. Description of the Prior Art

An image recording apparatus is well known in which recording particles are supplied to a recording region formed between a recording member and a recording electrode and a voltage is selectively applied to the recording electrode in accordance with an image signal thereby to form a visible image due to particles directly on the recording member. A toner is often used as such recording particles. An image recording apparatus for recording an image directly on a recording member in this way is disclosed in U.S. Pat. Nos. 2,584,695, 2,932,548, 3,563,734 and JP-A No. 58-50557.

In the well-known conventional image recording apparatuses, recording particles (such as toner) are controlled by a considerably great first force in order to keep the toner in recordable condition between a recording electrode and a recording member where they are supplied. In addition, the voltage applied to the recording electrode for image recording becomes unavoidably considerably high to generate a second force sufficiently great to attach the toner on the recording member over the first force. When the recording voltage applied to the recording electrode is high, it is difficult to regulate the toner adhesion which is subject to a great fluctuation under a slight voltage to a predetermined value accurately, thus deteriorating the quality of the image recorded. Also, since a great second force is required, it is necessary to lengthen the time of voltage application in view of the limitation of an applicable voltage value, thereby posing a great stumbling block to realization of a high-speed image recording. Another disadvantage of the conventional apparatus is that the position of the recording toner particles moves during the application of a recording voltage for a reduced sharpness of the image recorded.

SUMMARY OF THE INVENTION

An object of the present invention is to provide a method and an apparatus for recording an image in which a recording voltage is reduced and accurately controllable.

Another object of the present invention is to provide a method and an apparatus for recording an image in which a toner can be adhered to a recording member accurately with a small force to contribute to a high-speed operation.

Still another object of the present invention is to provide a method and an apparatus for recording an image in which a high-quality image recording operation is possible by holding a recording toner exactly in a predetermined position.

According to the present invention, there is provided a method and an apparatus for recording an image comprising means for inclining the forward end of recording electrodes in the direction of movement of a recording member, means for forming a region of high magnetic field extending from the forward end of the recording electrodes toward the recording member at substantially the same inclination as the recording electrodes, means for supplying the toner to the region and substantially balancing the toner carriage force due to the movement of the recording member with the toner attraction force of the magnetic field thereby to hold the toner in a predetermined position with a very small force, and means for applying a small recording voltage overcoming the small force to the recording electrodes under this condition thereby to cause the toner to adhere on the recording member for effecting an image recording operation.

The above and other objects, features and advantages will be made apparent by the detailed description taken in conjunction with the accompanying drawings.

BRIEF DESCRIPTION OF THE DRAWINGS

FIGS. 5 and 6 are diagrams showing the effect that the relationship between the inclination of the recording electrodes and the magnetic field has on the image recording condition.

Figs. 7 and 8 are diagrams showing another embodiment of the invention, in which FIG. 7 shows the whole system configuration, and FIG. 8 the image recording section in detail.

DESCRIPTION OF THE PREFERRED EMBODIMENTS

An embodiment of the present invention will be explained below in detail with reference to the accompanying drawings.

Figure 1:
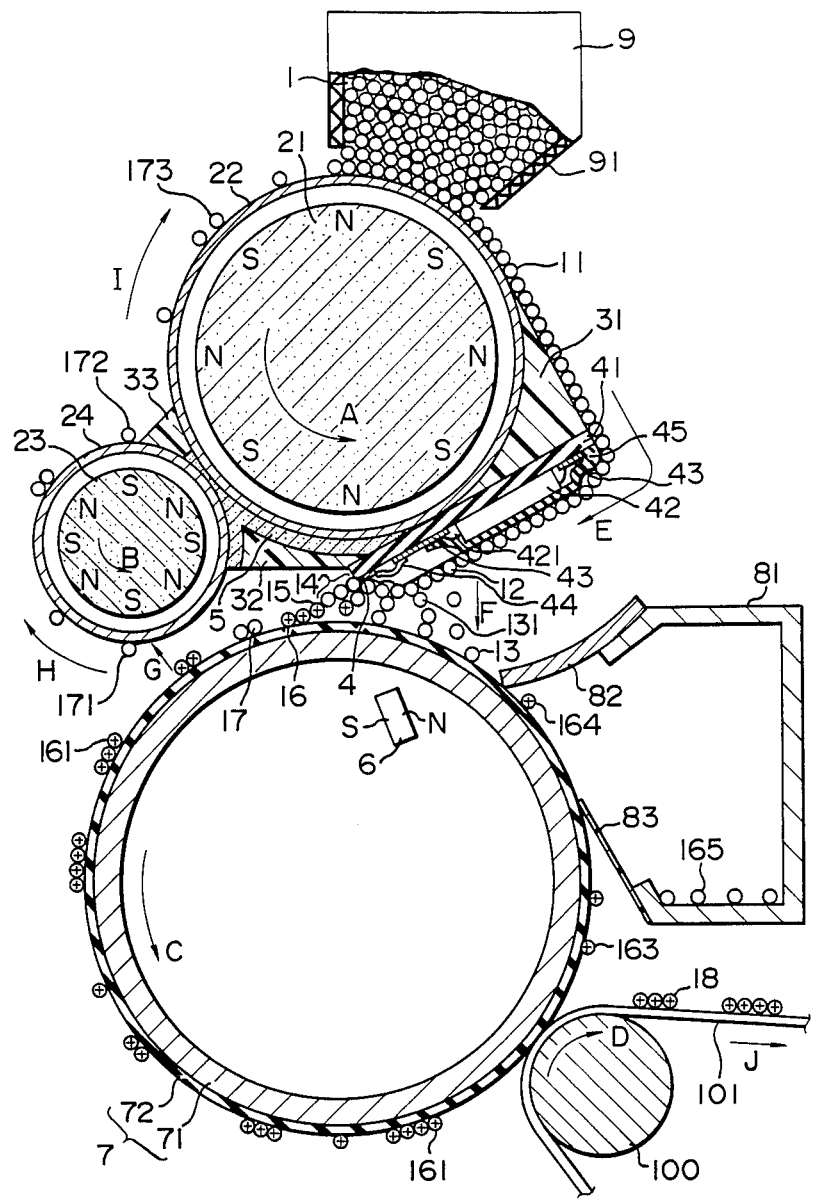
FIG. 1 is a sectional view showing an embodiment of the present invention.
Figure 2:
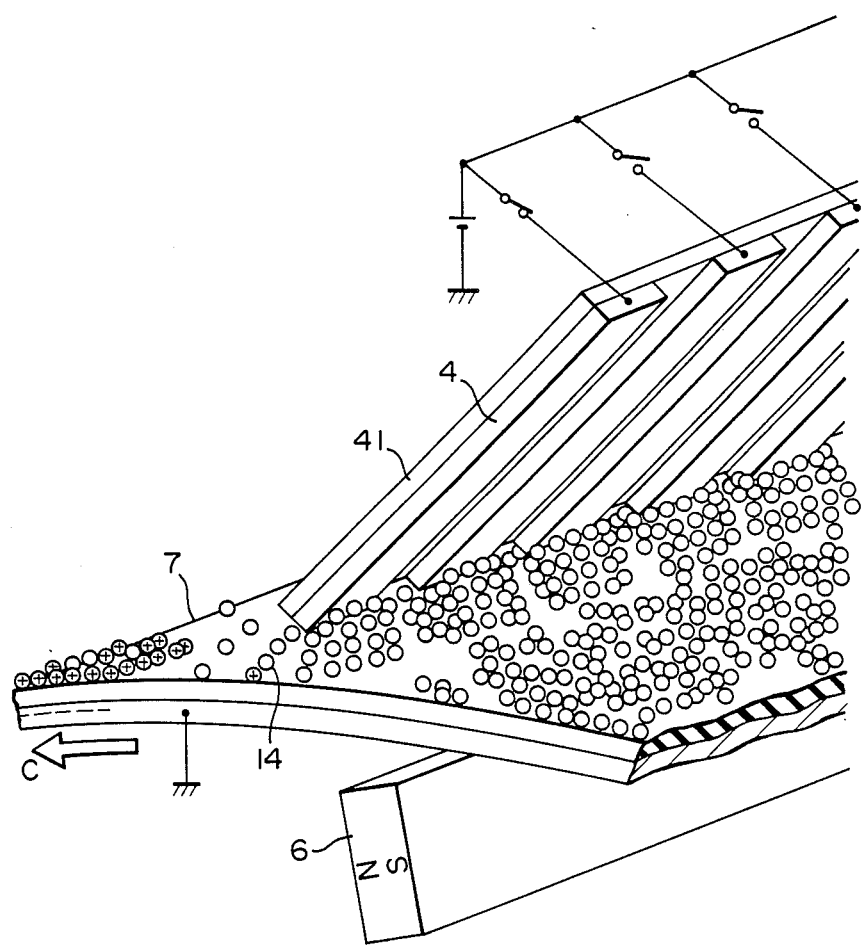
FIG. 2 is a perspective view showing a part of recording electrodes in enlarged form in FIG. 1.

FIG. 1 is a sectional view of an image recording apparatus according to an preferred embodiment of the present invention. FIG. 2 is a perspective view of a part of the recording electrodes shown in enlarged form in FIG. 1.

In FIG. 1, a conductive magnetic toner 1 is held in a casing (hopper) and is adapted to flow out of an opening formed at the lower part of the casing 9 and utilized for recording an image. A first magnetic roll 21 for supplying the toner is magnetized in alternate N and S polarities along the outer periphery thereof and is rotatably held within a first sleeve 1 made of a non-magnetic material. When the first magnetic roll 21 is driven in the direction A in the drawing by a drive motor not shown, the toner 1 in the casing 9 is carried from the opening thereof toward the forward end of the recording electrode 4 along the surface of guide members 31, 45 by the action of an alternating magnetic field generated by the rotation of the magnetic roll 21. An electrode base plate 41 made of a non-magnetic insulating material (such as ceramics) is arranged at an angle of 30° as shown in FIG. 1 or FIG. 2. This electrode base plate 41 carries thereon a fine-line pattern 43 made of a conductive material (which is preferably non-magnetic), a plurality of needle-like recording electrodes 4 made of a conductive material (which is preferably magnetic) arranged in the direction perpendicular to the page at the lower end (forward end) of the base plate 41, and a driving integrated circuit (driver) for applying a recording voltage that is an electrical signal corresponding to the image pattern to be recorded to each of the recording electrodes 4. A terminal 421 of the driver 42 is securely fixed to the fine-line pattern 43 by soldering or the like. Further, the fine-line pattern 43 is coupled to the recording electrodes by a bonding wire 44. The surface of the electrode base plate 41 on the recording electrode side is covered with a protective member 45 made of an insulating non-magnetic material except for the forward end of the recording electrodes 4. The electrode base plate 41 is closely held with the first sleeve 22, and the end of the base plate far from the recording electrodes (rear end) has arranged thereon a guide member 31 of a non-magnetic material for carrying onto the base plate the toner 1 carried from the outer peripheral part of the first sleeve 1. The forward end of the electrode base plate 41 is slightly projected from the lower end of the sleeve 22. In order to eliminate the adverse effect that the alternating magnetic field generated by rotation of the magnetic roll 21 on the recording operation, a magnetic member 5 is arranged in a region between the projection of the base plate 41 and the sleeve 22. A second guide member 32 of a non-magnetic material is interposed between the projection of the non-base plate 41 and the magnetic member 5 in order to promote the carriage of the toner separated from the forward end of the recording electrodes and not forming a toner chain toward a first toner remover described later.

In this embodiment, a recording medium 7 for recording an image is configured of a non-magnetic hollow conductive drum 71 and a recording member 72 made of an insulating member (that is a dielectric member) formed on the surface of the drum 71. The drum 71 is made of such a material as Al (or an aluminum alloy), and the recording member 72 of an oxide film formed by anodization of the surface of the aluminum (or aluminum alloy) member. Such a recording medium 7 is rotated at a fixed speed in the direction C in the drawing by driving means now shown (such as a motor or a motor coupled with a transmission mechanism). A small gap is formed between the forward end of the recording electrode 4 and the surface of the recording member 72, and a toner chain is formed in the region of the gap. This gap may preferably be 20 μm to 300 μm is size.

The recording medium 7 has a first toner remover on the outer peripheral part and in the direction of movement (rotation) of the recording medium 7 downstream of the recording electrodes 4. The first toner remover removes the non-charged or slightly charged toner (unrequired toner) which is separated from the toner chain by the carriage force.

The toner remover includes a second magnetic roll 23 rotated in the direction B in the drawings, a second sleeve 24 made of a non-magnetic material, and a third guide member of a non-magnetic material which facilitates the movement of the toner 172 between the sleeve 24 and the first sleeve 22. A slight clearance (preferably 0.2 mm to 5 mm) is provided between the surface of the second sleeve 24 and the outer surface of the recording medium 7. The unrequired toner 17 on the surface of the recording member 72 moves on the sleeve 24 (in the direction G in the drawings) by the magnetic force of the magnetic roll 23. The unrequired toner 171 moved on the sleeve is recovered into a casing 9 finally after being moved in the direction H on the sleeve.

A transfer unit for transferring a toner image recorded the recording member onto a separate recording sheet (such as a sheet of paper) is mounted downstream of the first toner remover on the outer periphery of the recording medium 7. In the case of FIG. 1, this transfer unit is comprised of a transfer roller 100, a motor (not shown) for driving the roller 100, a pressing mechanism (not shown) for pressing the roller 100 against the recording medium 7, a voltage source 102 for exerting a Coulomb force between the recording paper 101 and the toner 161 on the recording member 72. The recording paper 101, which is fed between the roller 100 and the recording medium 7, has the toner 18 transferred thereto and carried to a fixing section for producing a storage image.

A second toner remover for removing the toner remaining on the recording member 72 is mounted downstream of the transfer unit along the outer peripheral part of the recording medium 7. In the case of FIG. 1, the second toner remover is comprised of a box member 81 for recovering the toner 165 separated, a cleaning blade 82 mounted at an end of the box member, and a guide plate 83 for guiding the fall of the toner 165 separated by the blade 82 into the box member 81.

Means 6 for generating a magnetic field (a magnet) for forming a toner chain due to a static magnetic field is arranged between the forward end of the recording electrodes 4 and the surface of the recording member 72 on the side of the recording medium 7 far from the recording electrodes (within the hollow drum in the case of FIG. 1). The position and the direction of magnetic poles of the magnet 6 are adjusted within the drum 7 in such a manner that the toner chain 14 extends from the foward end of the recording electrodes 4 along the direction of inclination thereof into contact with the surface of the recording member 72. In the position and the direction of magnetic poles of the magnet 5 schematically shown in FIG. 1, the toner chain inclined downstream along the direction of movement of the recording member 72 is stably formed.

Figure 3:
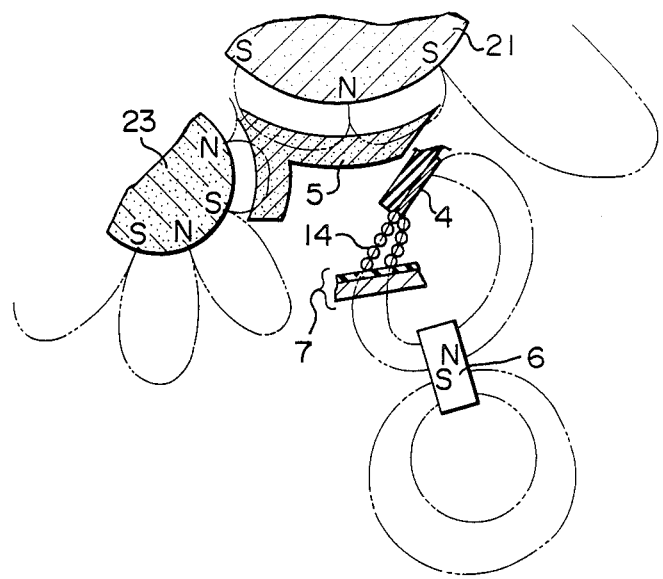
FIG. 3 is a diagram for explaining the magnetic field of the apparatus shown in FIG. 1.

FIG. 3 shows the condition of a magnetic field in the embodiment of FIG. 1. In FIG. 3, magnetic fluxes generated by the first magnetic roll 21 and the second magnetic roll 23 in FIG. 1 are shown by a dashed line. The magnetic member 5 made of a material of a high saturated magnetic flux density is formed with a considerable thickness and the width thereof along the direction of rotation of the magnetic roll is set to a value equivalent to or more than the distance between the magnetic poles of the magnetic roll. This configuration is preferable as it prevents the magnetic field generated by the magnetic roll from leaking toward the recording side. The magnetic fluxes generated by the magnetic rolls 21, 23 are concentrated in the magnetic plate 5 high in magnetic permeability thereby to eliminate the effect of the alternating magnetic field on the recording electrode side of the magnetic plate 5, thus greatly contributing to the realization of stable formation of a toner chain and hence superior image recording. Also, the recording electrode 4 is arranged in the static magnetic field generated by the magnet 6 and the recording electrode 4 is made of a magnetic material, so that lines of magnetic force are concentrated in the recording electrode 4. A toner chain 14 is formed stably at the position where the lines of magnetic force are concentrated.

As shown in FIG. 1, the angle of electrode $\theta_e$ is substantially coincidental with the angle of the most downstream toner chain $\theta_t$. As a result, the electrical contact between the recording electrodes and the toner chain is improved for an efficient generation of the electric force Fe.

Now, the operation of the embodiment shown in FIG. 1 configured as above will be explained in detail. First, the first magnetic roll 21 rotates in the direction of the arrow A (counterclockwise) to generate an alternating magnetic field. This magnetic field functions to supply the toner 1 in the casing 9 toward the recording electrode 4 through a small gap between the first sleeve 22 and the lower end of the doctor blade 91. Specifically, the toner 11 carried through the small gap is further carried along the direction of E in the drawings by way of the sleeve 22 and the guide member 31. The toner 12 carried to the proximity of the end of the magnetic member 5 is less affected by the magnetic field of the magnetic roll 22. The magnetic field of the permanent magnet 6 and the gravitational pull (downward force) causes part of the toner 13 (the toner upstream of the recording electrode) to move (fall) along the direction of an arrow F. Another part of the toner 131 is concentrated on the protective member 45 in proximity to the recording electrode 4 by concentration of magnetic fluxes in the recording electrode 4. As a result, the toner is supplied to the region between the recording electrode 4 and the recording member 72.

Figure 4:
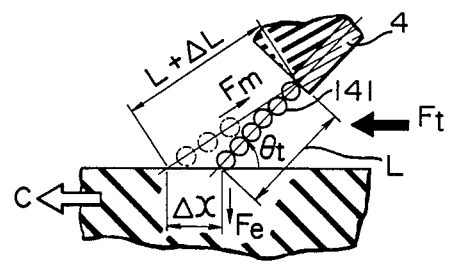
FIG. 4 is a diagram for explaining the principle of image recording operation of the apparatus shown in FIG. 1.

The recording medium 7 rotates at a fixed speed along the direction of an arrow C (counterclockwise). By this rotation, the toner 13 is carried to the recording electrode 4 and coupled with the toner 131 to form a toner pool at a point upstream of the forward end of the recording electrode 4. The toner at this toner pool is subjected to a carriage force Ft by the rotation of the recording medium 7. As shown in FIG. 4, upon exertion of the toner carriage force Ft on the most downstream toner chain 141, the most downstream toner chain 141 moves by a distance $\Delta x$ in the downstream direction as shown by dashed line. Let the initial length of the toner chain be L, and the length of the toner chain 141 after movement is assumed to increase by $\Delta L$. When $\theta_t$ is 90°, the change of $\Delta L$ is very small, while when $\theta_t$ is small as in the present invention, $\Delta L$ increases greatly, with the result that the position of the most downstream toner chain contributing to the image recording is stabilized in the manner mentioned below.

When the toner chain becomes longer than in initial state, the most downstream toner chain becomes loose so that the magnetic coupling force acting on the toner chains each other disappears and toner particles are separated from the toner chain. The toner carriage force Ft mainly acts strongly on the toner in contact with the recording medium, while the magnetic coupling force under concentration of magnetic fluxes of the recording electrode is exerted on the toner in contact with the recording electrode. The toner carriage force Ft and the magnetic coupling force are so related to each other that the toner in contact with the recording medium is mainly separated onto the recording medium from the most downstream toner chain. Even after this separation, toner particles carried from upstream side along the recording medium are recombined thereby to form a new most downstream toner chain. In this way, the most downstream toner chain is always in a magnetically stable position.

Now, explanation will be made of relative force acting on this most downstream toner chain.

Forces acting on the most downstream toner chain when the recording medium is stationary may include a magnetic force Fm directed toward the recording electrode, a toner adhesion Fd acting in the direction toward the recording medium, a compressive force Fc generated in the toner chain as it is compressed by the recording medium and the recording electrode, and the resistance of the recording medium and the recording electrode generated by relative forces. The compressive force Fc is directed toward the recording medium on the recording medium side under the toner chain. Also, the toner adhesion force Fd is generated by the gravity, the van der Waals force, the absorption force of water content, the electrical absorption force due to frictional charges of the toner, etc. This force Fd varies and probably changes with the shape or size of the toner, contact, difference in charging characteristics and environmental conditions. The force Fd is very small as compared with Fm.

On condition that the most downstream toner chain comes into contact with the recording medium, equation (1) below holds.

$$Fc + Fd - Fm \cdot \sin \theta_t > 0 \tag{1}$$

where $\theta_t$ is an angle formed by the toner chain to the recording medium.

When the recording medium moves in the direction C in the drawings, the most downstream toner chain is subjected to the force which might be exerted thereon while the recording medium is stationary and further to the frictional force Ff exerted in the direction of movement of the recording medium as well as the toner carriage force Ft exerted from a number of toner chains existing in the recording region upstream of the most downstream toner chain.

The frictional force Ff is given by equation (2).

$$Ff = \mu(Fc + Fd - Fm \cdot \sin \theta_t) \tag{2}$$

where $\mu$ is the coefficient of friction between the toner and the recording medium. Thus, Ff is a function of the compressive force Fc of the toner chain, the magnetic force Fm, the inclination $\theta_t$ of the toner chain and the toner adhesion Fd.

The toner carriage force Ft, which is a frictional force exerted on each toner chain upstream of the most downstream toner chain, is expressed by equation (3).

$$Ft = \sum_{i=2}^{n} F_{fi} \tag{3}$$

where the affix i indicates the number of a particular toner chain as counted from the most downstream toner chain and n the total number of toner chains.

Ft is a combined force of $F_{fi}$, and therefore acts in the direction from upstream toward downstream along the movement of the recording medium. Since the number n of toner chains takes a great value, the value of Ft also takes a comparatively large value.

The most downstream toner chain is moved by a small distance of $\Delta x$ downstream of the drum rotation by the toner carriage force Ft. As a result, the compressive force Fc that has thus far been exerted on the toner of the most downstream toner chain in contact with the recording member takes a small value.

The result is that main forces exerted on the same toner of the most downstream toner chain under the condition free of any applied recording voltage are the magnetic force Fm and the toner carriage force Ft. In this embodiment, a magnet is arranged in the drum in such a manner that the toner carriage force Ft is almost balanced with the horizontal component of the magnetic force Fm (Fm·Cos $\theta_t$).

Under this condition, a recording voltage is applied selectively to a number of recording electrodes 4 by the integrated circuit 42. As a result, different types of charges are induced in the conductive member 71 and the toner 15 of the most downstream toner chain in contact with the recording member 72, so that the Coulomb force Fe acts on the toner 15. In the process, the toner 15 adheres to the recording member 72 by the force Fe, thereby causing a force in the same direction as the toner carriage force Ft. The toner 15 thus moves downstream while being adhered to the recording member 72 over the horizontal component of the magnetic force. A conditional expression of relative forces for this movement is roughly as follows:

$$Ft + \mu Fe > Fm \cdot \cos \theta_t \tag{4}$$

where Ft is almost balanced with Fm·cos $\theta_t$, and therefore the conditional expression holds by a small Coulomb force Fe.

This indicates that the image recording is possible by applying only a small Coulomb force Fe to the toner 15, thus realizing an image recording at low voltage or at high speed.

The toner 16 separated adheres to the recording medium by adhesion Fe and thus forms a recorded image.

Toner is continuously supplied from upstream side, and therefore a toner chain is again formed instantaneously to be ready for the next voltage application. That part of the toner chain connected to the electrode that has no been impressed with a voltage which is in contact with the recording member 72 is caused to flow downstream with the movement of the recording member 72 by the toner carriage force Ft like the toner 17 in FIG. 1.

A recording image is determined by the toner separated from the most downstream toner chain.

The toner 17 on the recording member 72, which flows out by being separated from the downstream toner chain 14 by the above-mentioned operation, is substantially non-charged. This toner 17 has no significant function to record an image but exists only as a smear of an image. The toner 17, which is non-charged substantially, has a weak adhesion with the recording member 72 as compared with the toner 16. Therefore, the toner 17 approaching the first toner remover with the rotation of the recording medium 7 is moved in the direction G in the drawings and adheres on the sleeve 24 by the force of a magnetic field generated by the magnetic roll 23. The toner 171 that has adhered on the sleeve 24 moves in the direction of arrow H along the sleeve 24. This toner is recovered in the casing 9 through a guide member 33 and the sleeve 22 for re-use. The remove of this unrequired toner 17 makes it possible to realize an even more clear image recorded on the recoreing member 72 where only the charged toner 16 remains.

This image formed by the toner (a pattern formed on the recording member 72 by charged toner) is carried further downstream with the rotation of the drum. When the toner 161 reaches the position where transfer means is installed, transfer is made onto the recording paper 101. Specifically, a transfer roller 100 is pressed against the drum 7 whereby the electric field functions to transfer the charged toner onto the recording paper. The transfer roller 100, which is rotating in the direction of arrow D, moves along the direction of arrow J while forming an image on the top surface thereof with the transfer toner 18. And through the well-known processes of thermal fixing, pressure fixing or the like fixing, a permanently standing image is formed on the recording paper 101.

Although most of the toner on the recording member 72 is transferred onto the recording paper 101 by the transfer means, a slight part thereof remains as toner 163 on the recording member 72 without being transferred. It is possible to reuse this toner 163 by supplying it to the recording region, it is removed from the recording paper 72 for fear that it may be mixed with such foreign matters as paper dust during transfer. Specifically, when the remaining toner reaches the position of a cleaning blade 82 with the drum rotation, the toner 164 is scratched off by the blade 82 and is accommodated in the box member 81. The toner 161 thus accommodated is reused after impurities are removed or an antistatic operation is effected by appropriate means.

Depending on the pattern of an image to be recorded, the toner may be oversupplied to cause a great amount of toner to stay in the toner pool in the region between the recording electrode 4 and the recording mamber 72. Specifically, in a recording process involving much image portions where no toner attachment is required, less toner is separated from the toner chain by being charged and strongly combined with the recording member 72. Even in such a case, what is called the toner carriage force is exerted by the toner at toner pool to push the toner downstream of drum rotation. This toner carriage force causes non-charged toner of the toner chain not impressed with any voltage to flow out to some degree, and therefore the position of toner chain formation is not displaced noticeably. That toner more than necessary stays in the toner pool, however, is not desirable as the toner may overflow the toner pool to smear the surroundings or may have an adverse effect on machine operation. A sensor or observation equipment for measuring or observing the toner quantity in the toner pool is installed to prevent such inconveniences, and when the detected toner quantity exceeds a predetermined value, the rotation of the first magnetic roll 21 is stopped or decelerated and regulated to hold a constant quantity of toner. In the case where the toner quantity is smaller than a predetermined value, however, the rotational speed of the magnetic roll 21 is of course increased to increase the supply.

Figure 7:
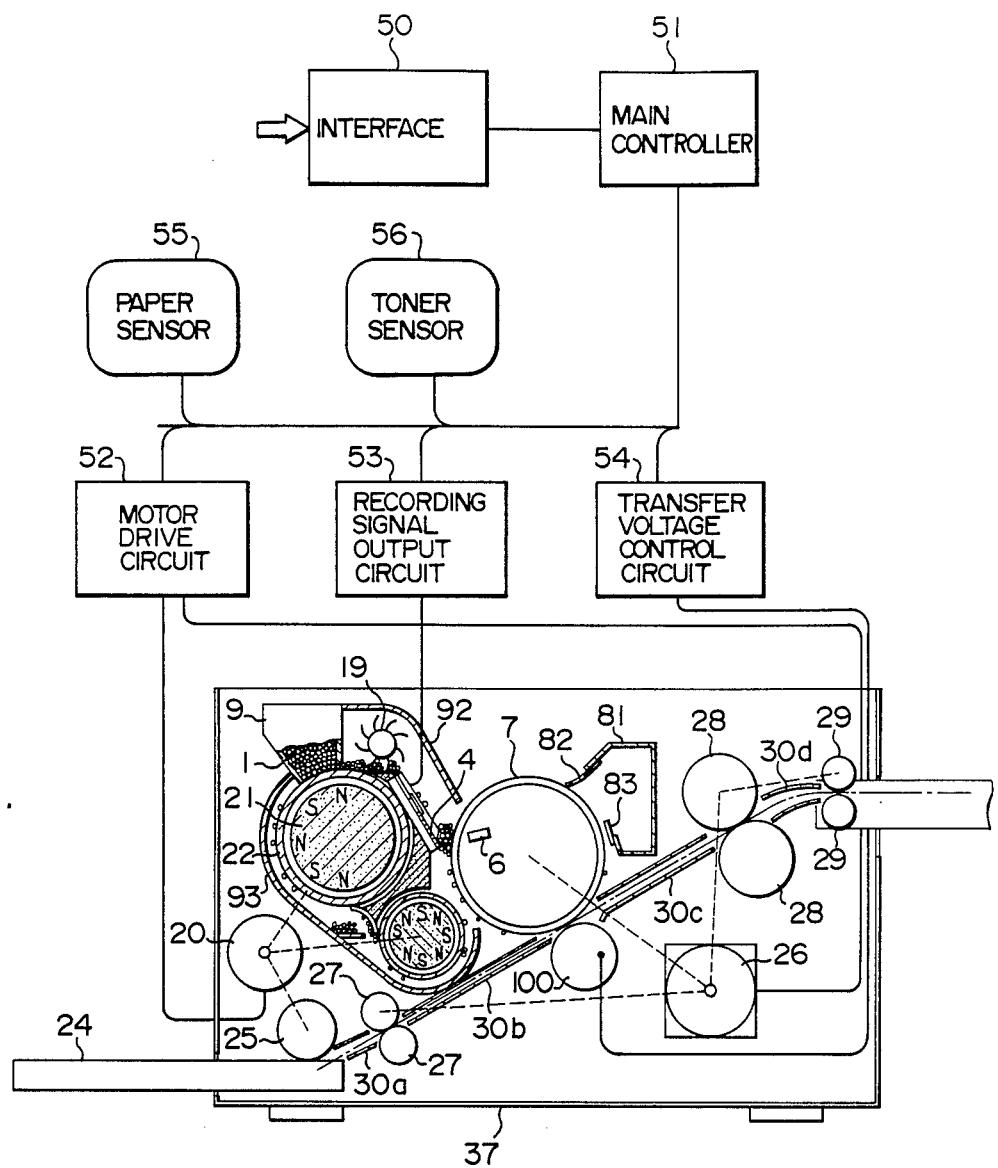
Figure 8:
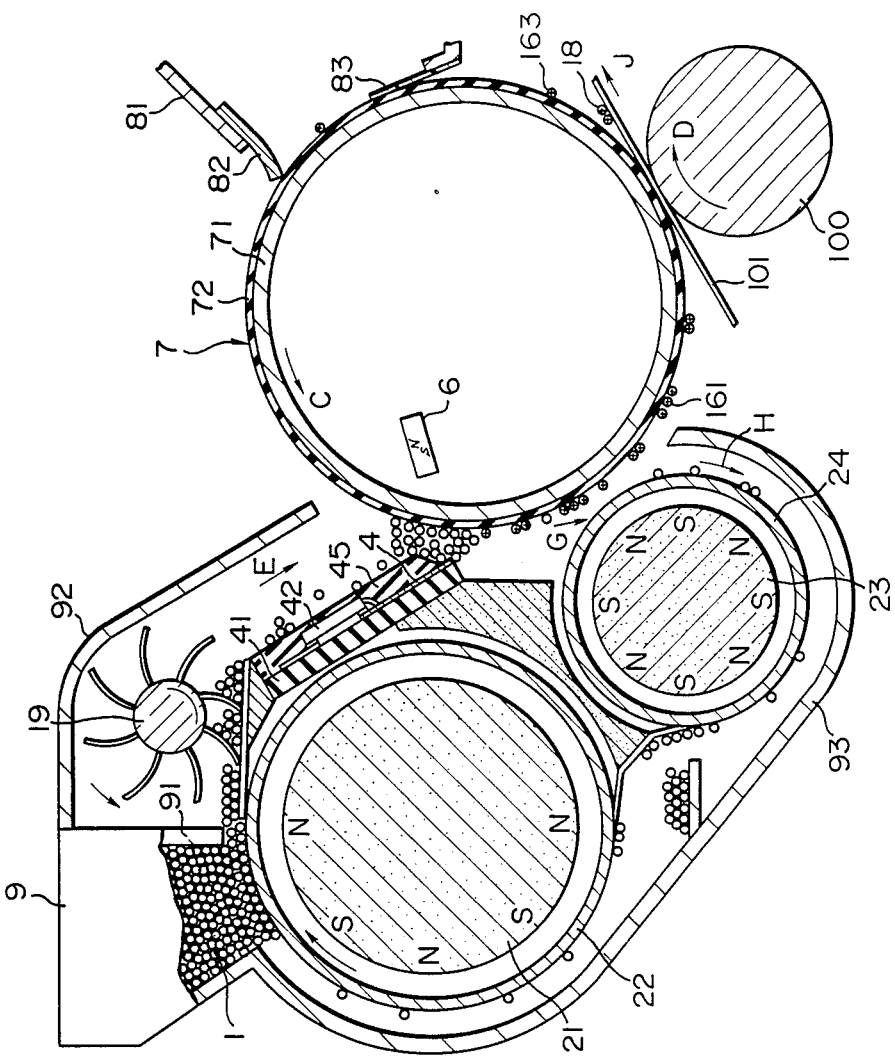

Now, explanation will be made of another embodiment of the present invention shown in FIGS. 7 and 8. FIG. 7 shows a whole configuration, and FIG. 8 an enlarged view of the image recording section in FIG. 7. The configuration shown in FIG. 8 is identical to that in FIG. 1 for the most parts thereof. The only difference between the configrations of FIG. 8 and FIG. 1 is that in the configuration of FIG. 8, the magnet 21 is not rotated but the sleeve 22 is rotated to supply the toner from the hopper into the region between the recording electrode and the recording member with the aid of a vane wheel 19, that the magnet 23 for recovering the unrequired toner 17 does not rotate but the sleeve 24, and that the configuration of FIG. 8 includes covers 92, 93 for prevention of toner spraying.

In FIG. 7, the driving motor 20 is adapted to impart the turning effort for the sleeves 22 and 24. The motor 20 also drives a pick-up roller 25 for feeding sheets of recording paper in the tray 24. The driving motor 20 further drives a timing roller 27, a transfer roller 100, a drum 7, a heat roller 28 at the fixing section, and a paper delivery roller 29. Numerals 30a to 30d designate paper guides. A control section includes an interface for input and output control of data with external equipment, a main controller 51, a motor driving circuit 52, a recording signal output circuit 53, a transfer voltage control circuit 54, a paper sensor 55 and a toner sensor 56. The control section, which is actually accommodated in the chassis, is depicted out of the chassis as a block diagram for facilitating the understanding. The main controller 51 converts the character codes and pattern data input thereto into an image signal and supplies the resulting recording signal to an output circuit 53, and performs such other operations as supplying a motor drive command to a motor drive circuit 52 or supplying a transfer voltage command to a transfer voltage control circuit 54.

Now, the operation of the embodiment shown in FIGS. 7 and 8 will be explained. When a power switch not shown in turned on, the main controller 51 drives a heat not shown of the heat roller 28 and thereby controls the heat roller 28 to a proper fixing temperature (such as 200° C.). Further, the main controller 51 is impressed with a signal from the paper sensor 55 and the toner sensor 56, and if paper is contained in the cassette 24 and sufficient amount of toner is filled in the toner supply, renders the system ready for recording from external equipment. If paper or toner is in short supply, the fact is indicated on a display panel not shown. When data to be recorded is supplied under this condition from the external equipment, the main controller 51 decodes the data and coverts it into a recording signal, which is stored in an internal buffer memory. The recording signal thus stored in the buffer memory is sequentially supplied to the output circuit 53. At the same time, a motor drive command is applied to the motor driving circuit 52. In response to this command, the motor driving circuit 52 drives the motors 20, 26. With the rotation of the pick-up roller 25, the paper in the cassette 24 is carried. When the paper is passed through the guide 30a and the forward end thereof reaches the timing roller 27, the mounting shaft of the pick-up roller 27 is stopped. The paper that has passed the timing roller 27 passes the guide 30b to the transfer section. An image has been recorded by the time when the forward end of the paper is fed to the transfer section. A toner image to be recorded at the forward end of the paper thus reaches the transfer section by rotation of the recording drum 7. The paper is fed within the transfer section in synchronism with the rotation of the recording drum 7. As a result, the toner image recorded sequentially on the recording drum 7 is sequentially transferred onto the recording paper by the rotation of the recording drum 7. After transfer, the paper reaches the heat roller 28 through the guide 30c, and by the heat supplied thereto from the heat roller 28, the toner fuses on the paper to form a permanently recorded image. The paper after being fixed is carried out of the system by the roller 29. An image is recorded by toner on the recording drum on exactly the same principle as that for the operation explained with reference to FIG. 1. Specifically, with the rotation of the drum 7, the toner is supplied to the region between the forward end of the recording electrodes 4 arranged in inclination and the surface of the drum, and the component $Fm \cdot \cos \theta_t$ in the direction of drum movement of the magnetic force Fm generated by the magnet 6 disposed in the drum is balanced substantially with the toner carriage force Ft. Under this condition, a recording signal is supplied from the buffer memory in the main controller 51 sequentially to the output circuit 53. The output circuit 53 applies this recording signal to the driver 41 of the recording head. Upon application of a recording voltage corresponding to the recording signal to the recording electrode by the driver 41, an adhesion Fe due to the Coulomb force is generated in that toner of the most downstream toner chain impressed with the voltage which is in contact with the drum surface, and this Coulomb force moves the particular toner downstream of drum rotation while attaching to the drum. A toner image is thus formed on the drum surface.

As explained above, the recording electrodes and the most downstream toner chain contributing to the recording are inclined toward the direction of movement of the recording medium as viewed from the recording electrode side and are thus formed at an always fixed position within a tolerable range, thus making it possible to record an image of high resolution at high speed.

The inclined formation of the toner as mentioned above is actually realized by setting relative positions of the recording electrode 4, the recording medium 7 and the magnet 6 and also setting the intensity and size of the magnet in appropriate manner. Explanation will be made below of an experimental case in which the quality of the recorded image as relative to variously-changed magnet positions and the angle of the recording electrode. In this case, a plurality of Ni electrodes 37 $\mu$m thick arranged in the number of ten for each 1 mm were used as the recording electrodes 4. Also, an aluminum with the anodized oxide surface having an insulating film of 10 $\mu$m thickness was used as the recording medium 7. The magnet 6, on the other hand, is the Hicorex 18B of Hitachi Metal, and the toner the Conductive Magnetic Toner P443-2 of Hitachi Metal. The experiment was conducted with a recording voltage of 45 V and a recording speed of 20 cm/s.

Figure 5:
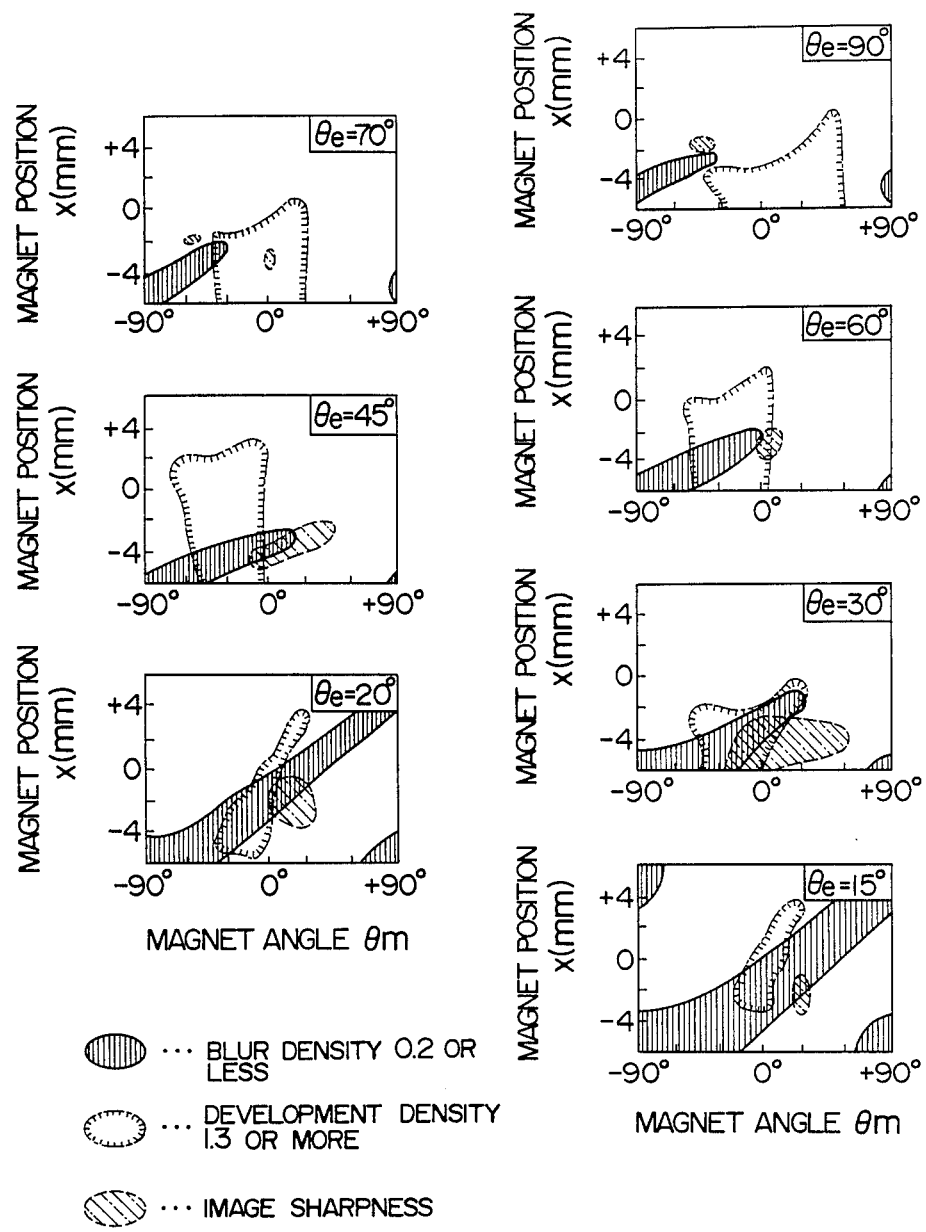

FIG. 5 shows the result of the experiment which was conducted the gap Ge between the recording electrodes 4 and the recording medium 7 set to about 50 $\mu$m to 100 $\mu$m and the magnet position y to 3 mm to 6 mm, while changing the magnet position x, magnet angle $\theta_n$ and the electrode angle $\theta_e$.

A recorded image is required to be clear and high in recording density. Further, in view of the fact that the smear of the image is mainly attributable to non-changed toner as described above while a recorded image formed by charged toner, non-charged toner can be removed by utilizing the difference in adhesion to the recording medium. In the process, since the effect on the recorded image increases with the amount of non-charged toner, it is more desirable that the smear, that is, a blur be reduced as a result of a small amount of non-charged toner.

As seen from FIG. 5, the range of the magnet position and magnet angle realizing a clear image are widened with the decrease in the angle of the recording electrodes $\theta_e$, and is reduced again at 20° in the angle of the recording electrode again. With the inclination of the recording electrodes, the most downstream chain contributing to the recording operation is thought to become liable to be inclined thereby to widen the range of a clear image formation. If the recording electrodes are inclined excessively, by contrast, the most downstream toner chain is likely to be formed in excessively inclined style, thus narrowing the range of forming a clear image.

The range of magnet position and angle for realizing a reduced blur, on the other hand, is widened with the decrease in the angle $\theta_e$ of the recording electrodes. This is considered attributable to the fact that an inclination of the recording electrodes toward the toner pool causes a magnetic force to be exerted on much toner thereby to reduce the toner carriage force.

A range in which the image is clear with a high recording density and small blur does not substantially exists for the angle 90° of the recording electrodes. Such a range exists to a small degree for the recording electrode angle of 20° and 60°, while it sufficiently widens for the recording electrode angle of 45° and 30°.

This situation will be explained in detail with reference to FIG. 6. FIG. 6 is a side view schematically showing an example of magnet position and angle and an associated condition of magnetic fluxes in the case where a clear image is recorded as in the above-mentioned case with the recording electrode angles of 90°, 30° and 15° based on the result of experiments. Similarly, the magnet position and angle together with the condition of magnetic fluxes for a high recording density are shown in a side view.

In FIG. 6, take note of the conditions of magnetic fluxes when the image is clear. For all the recording electrode angles of 90°, 30° and 15°, the magnetic fluxes are inclined from the recording electrodes downstream of the direction of movement of the recording medium with a high magnetic flux density. The most downstream toner chain that determines an image recorded is formed substantially at this position along the direction of magnetic fluxes. Specifically, as seen from FIG. 6, a clear image is formed in the case where the most downstream toner chain is formed inclined downstream of the direction of movement of the recording medium as viewed from the recording electrode side for all angles of the recording electrodes.

As is apparent from this description, if the magnetic fluxes are to be inclined downstream of the direction of movement of the recording medium from the recording electrodes with a high magnetic flux density, it is effective to incline the recording electrode upstream of the direction of movement of the recording medium. For this reason, as shown in FIG. 5, the range of clear image formation with an inclined most downstream toner chain widens progressively with the inclination of the recording electrode to 90°, 60°, 45° and 30° in that order.

In the case where the most downstream toner chain is inclined excessively downstream of the direction of movement of the recording medium, however, the image is disturbed. In fact, at a recording electrode angle of 15°, the above-mentioned effect of the inclination of the recording electrodes causes the most downstream toner chain to be inclined more than a proper value, thus narrowing the range of clear image formation with proper inclination of the most downstream toner chain.

Now, take note of the conditions of the magnetic field in the case where there is less blur. As shown in FIG. 6, for all the recording electrode angles of 90°, 30° and 15°, the magnetic flux density is high at a point in proximity to the recording electrodes. The magnetic flux density is also comparatively high in this case at a point upstream of of the direction of movement of the recording medium rather than the recording electrodes. The particular point upstream of the direction of movement of the recording medium is where the toner is supplied to the recording electrodes. The high magnetic flux density at this position indicates that a comparatively high magnetic force is exerted on the toner at this position. As a consequence, even when the recording medium moves, the toner carriage force remains comparatively small so that the toner is not supplied excessively and therefore the resultant smaller amount of non-charged toner reduces the case of blurred image.

An effective method to increase the magnetic flux density upstream of the direction of movement of the recording medium is to incline the recording electrodes upstream of the direction of movement of the recording medium. For this reason, the range of the magnet position and angle realizing a recorded image free of blur widens with the progressive inclination of the recording electrode to 90°, 60°, 45°, 30° and 20° in that order. In fact, for the recording electrode angle of 90°, it is comparatively difficult to reduce the blur, and in FIG. 5, the region small in blur for the recording electrode angle of 90° is low in recording optical density due to an excessive magnetic force and sufficient recording is not effected, a situation to which the formation of a recorded image small in blur is limited.

On the other hand, it is easy to produce a high recording optical density when the magnetic fluxes are in the condition shown in FIG. 6. In such a case, magnetic fluxes high in density are produced straight from the end of the recording electrode. As a result, the recording electrode and the toner chain as n an improved contact with each other, thereby improving the electrical condition of the toner chain and increasing the recording optical density.

When the recording electrode angle is 90°, as shown in FIG. 6, it is difficult that the condition of magnetic fluxes with a clear recorded image coincides with that for a high recording optical density or that for a small blur. Also, for the recording electrode angle of 15°, as shown in FIG. 6, the condition of magnetic fluxes for a high recording optical density is liable to be slightly displaced from that for a small blur if a clear image is to be recorded, thus making it difficult to produce a recorded image of a high quality. When the angle of the recording electrode is 30°, on the other hand, a clear recorded image with high recording optical density small in blur can be obtained easily under the same condition of magnetic fluxes. Specifically, the angle of the recording electrode should not be neither too large nor too small.

As is evident from the result of the above-mentioned experiment, an image of a high resolution can be recorded easily by inclining the recording electrode upstream of the direction of movement of the recording medium and forming the most downstream toner chain contributing to the recording by being inclined in substantially the same direction as the recording electrodes.

The present invention is not confined to the above-mentioned embodiments but may be modified in various ways within the scope intended. For example, a recording medium may be made of a transparent flexible plastic base plate as an insulating member coated with a thin transparent conductive layer and the insulating member side of the recording medium is arranged on the recording electrode side to form a recorded image on the recording medium by means similar to those used in the first and second embodiments, so that the resulting recorded image may be displayed on a display unit by a transmitted or reflected light.

Unlike in the embodiment shown in FIG. 1 where the second magnetic roll is rotated, the second sleeve may be rotated to recover the non-charged non-image forming toner.

Also, instead of using an electrode base plate having a rigidity as in the above-mentioned embodiments, a flexible base plate may be used to arrange the electrode base plate smoothly on the sleeve.

We claim:

1. A method of image recording comprising the steps of:
   moving a recording member in a direction;
   preparing a plurality of recording electrodes in the direction crossing the direction of movement of the recording member, the forward end of the recording electrodes being inclined along the direction of movement of the recording member;
   forming a region of a high magnetic field inclined at substantially the same angle as the recording electrodes and extending from the forward end of the recording electrodes to the surface of the recording member;
   supplying a toner to the region of high magnetic field and balancing the toner carriage force generated in the toner by the movement of the recording member with the toner absorption force of the magnetic field thereby to hold the toner at a predetermined position within the region of high magnetic field with a very small force; and
   applying a recording voltage exerting a small force sufficient for the toner to adhere on the recording member over the small force against the recording electrode thereby to record an image with the toner on the recording member.

2. A method of image recording according to claim 1, wherein the recording electrodes are inclined at an angle of 20° to 60° to the surface of the recording member.

3. A method of image recording comprising the steps of:
   arranging the forward end of recording electrodes away from the surface of a recording medium of a drum including a hollow conductive portion having a recording member of an insulating material formed on the outer surface thereof, the forward end of the recording electrodes being inclined along the direction of the rotation of the drum;
   leading the toner toward the forward end of the recording electrodes;
   exerting the magnetic field generated by a magnet arranged within the drum on the toner thus led, forming a toner chain in contact with the surface of the recording medium from the forward end of the recording electrodes which toner chain is inclined along the direction of inclination of the recording electrodes, balancing the toner carriage force generated by rotation of the drum substantially with the magnetic force due to the magnetic field; and
   applying a voltage selectively in accordance with the image to be recorded to the recording electrodes thereby to destroy the balanced state and causing the toner of the toner chain in contact with the drum to adhere to the outer surface of the drum thereby to record an image with toner on the outer surface of the drum.

4. A method of image recording comprising the steps of:
   holding a plurality of recording electrodes including needle-like conductors aligned in a direction perpendicular to the direction of movement of a recording medium, in such a manner that the recording electrodes are separated from the recording medium and has the forward end thereof inclined along the direction of movement of the recording medium;
   moving the recording medium in recording an image;
   supplying a magnetic toner to a region formed between the forward end of the recording electrodes and the recording medium;
   exerting a magnetic force on the toner supplied to the region thereby to form a toner chain continuous from the forward end of the recording electrodes to the surface of the recording medium in the region in substantially the same direction as the inclination of the recording electrodes while at the same time substantially balancing the toner carriage force generated in the toner by the movement of the recording medium with the magnetic force;
   applying an electrical signal corresponding to an image to be recorded between the recording electrodes and the recording medium with the toner chain formed, thereby causing the toner to adhere on the recording medium over the balanced condition; and
   removing the unrequired toner on the recording medium which is small in adhesion downstream of the direction of movement of the recording medium.

5. A method of image recording comprising the steps of:
   separating recording electrodes from a recording member and inclining the recording electrodes in the direction of movement of the recording member;
   moving the recording member in a direction in recording an image;
   supplying a magnetic toner to a region formed between the forward end of the recording electrodes and the recording member;
   exerting a magnetic field on the toner supplied to the region and forming a toner chain extending from the forward end of the recording electrodes to the surface of the recording medium in substantially the same direction as the inclination of the recording electrodes while at the same time balancing the toner carriage force generated in the toner by the movement of the recording member with the toner absorption force due to the magnetic field thereby to hold the toner chain in a predetermined position with a very small force;
   applying a small voltage to the recording electrodes sufficient to break the balance and thus causing the toner of the toner chain on the recording member side to adhere to the recording member thereby to form an image due to the toner; and
   transferring the image due to the toner, after being formed, onto a recording sheet.

6. A method of image recording comprising the steps of:
   separating recording electrodes from a recording member and inclining the recording electrodes in the direction of movement of the recording member;

moving the recording member in a direction in recording an image;

supplying toner to a three-dimensional region formed by the forward end of the recording electrodes and the recording member;

exerting a magnetic field on the toner supplied to the three-dimentional region and forming a toner chain extending from the forward end of the recording electrodes to the surface of the recording member downstream of the direction of movement of the recording member, while at the same time substantially balancing the toner carriage force generated with the movement of the recording member with the toner absorption force due to the magnetic field thereby to hold the toner chain in a predetermined position with a very small force;

applying to the recording electrodes a sufficiently small voltage selectively to break the balance thereby to cause the toner of the toner chain on the recording member side onto the recording member;

removing the unrequired toner, after forming the toner image, small in adhesion from the recording member; and transferring the image formed on the recording member onto a recording sheet.

7. An image recording apparatus comprising:

a recording member;

drive means for moving the recording member in one direction;

a plurality of recording electrodes having the forward end thereof arranged in spaced relationship with the recording member, the forward end being inclined in the direction of movement of the recording member, the recording electrodes being arranged in a direction at an angle to the direction of movement of the recording member;

means for supplying toner to the region making up said space;

means for generating a high magnetic field inclined in substantially the same direction as the recording electrodes and extending from the forward end of the recording electrodes to the recording member, and forming a chain of the toner supplied to the high magnetic field in such a manner that the toner carriage force exerted on the toner of the toner chain in contact with the recording member due to the movement of the recording member is substantially balanced with the toner absorption force of the magnetic field; and image signal applying means for applying an electrical signal corresponding to an image to be recorded.

8. An image recording apparatus according to claim 7, wherein the recording electrodes are inclined at an angle of $\theta_e$ which is selected within the range defined by $20° \leq \theta_e \leq 60°$.

9. An image recording apparatus according to claim 7, wherein said magnetic field generating means is positioned to form an inclined high magnetic field on the side of the recording member far from the recording electrodes.

10. An image recording apparatus according to claim 9, wherein said magnetic field generating means is a permanent magnet arranged at an angle to the direction of movement of the recording member.

11. An image recording apparatus comprising:

a drum including a hollow conductive portion with a recording member of an insulating layer formed on the outersurface thereof;

drive means for rotating the drum in a direction in recording an image;

a plurality of recording electrodes arranged in spaced relationship with a recording medium inclined at an angle to the direction of movement of the drum;

means for supplying toner to the space formed between the recording electrodes and the drum surface;

means for generating a magnetic force, arranged within the hollow part of the drum for forming a toner chain in the space thereby to connect the surface of the recording medium and the forward end of the recording electrodes through the toner in such a manner that the most downstream toner chain contributing to the recording operation is inclined in substantially the same direction as the recording electrodes from the forward end of the recording electrodes to the surface of the conductive drum, said magnetic force generating means generating a magnetic force substantially balanced with the toner carriage force exerted on the toner of the toner chain in contact with the recording member; and voltage applying means for supplying a voltage corresponding to an image to be recorded between the recording electrodes and the drum and applying a separating force to the toner of the most downstream toner chain in contact with the drum surface, thereby causing the toner to adhere to the surface of the recording member of the drum.

12. An image recording apparatus according to claim 11, wherein said recording electrodes are such that the angle formed between the recording electrodes and the tangential direction of the conductive drum is within the range from 20° to 60°.

13. An image recording apparatus comprising:

a recording member;

drive means for moving the recording member;

a plurality of needle-like recording electrodes arranged with a small gap from a recording member in the direction at an angle to the direction of movement of the recording member, said electrodes being inclined along the direction of movement of the recording member;

toner supply means for moving the toner along the surface of the recording electrodes on the recording member side thereof thereby to supply the toner to the small gap;

a magnet arranged on the side of the recording member far from the recording electrodes to exert a magnetic field on the toner supplied to the small gap, the position and the intensity of the magnetic field of the magnet being so selected that the carriage force of the toner supplied to the small gap which is generated by the movement of the recording member is substantially balanced with the toner absorption force due to the magnetic field; and image signal applying means for applying an electrical signal corresponding to an image to be recorded between the recording electrodes and the recording member after the toner chain is formed; and toner remover means arranged downstream of the region between the recording electrodes and the recording member for removing the unrequired toner that does not contribute to the image formation from the surface of the recording member.

14. An image recording apparatus comprising:
a recording medium including an insulating member in electronic contact with a conductive member;

drive means for moving the recording medium at least in one direction;

a plurality of recording electrodes including a plurality of needle-like conductors with the forward end thereof arranged with a gap from the recording medium, the forward end being inclined in the direction of movement of the recording medium, the electrodes being arranged in a direction at an angle to the direction of movement of the recording medium;

toner supply means for supplying a conductive magnetic toner to a small three-dimensional region formed between the forward end of the recording medium and the surface of the recording medium corresponding to the forward end;

means for generating a magnetic field exerted on the toner supplied to the three-dimensional region thereby to form a toner chain extending from the forward end of the recording electrodes to the surface of the recording medium in substantially the same direction as the inclination of the recording electrodes, said magnetic field generating means exerting a magnetic force on the toner chain which magnetic force is substantially balanced with the toner carriage force generated by the movement of the recording medium;

means for applying a voltage selectively to the recording electrodes; and transfer means for transferring the image formed by the toner onto a recording sheet downstream of the three-dimensional region along the direction of movement of the recording medium.

* * * * *